United States Patent
Lee et al.

(10) Patent No.: US 10,703,839 B2
(45) Date of Patent: Jul. 7, 2020

(54) METHOD FOR PREPARING ACRYLIC COPOLYMER, ACRYLIC COPOLYMER AND RESIN COMPOSITION COMPRISING THE COPOLYMER

(71) Applicant: LG Chem, Ltd., Seoul (KR)

(72) Inventors: Chang No Lee, Daejeon (KR); Yoon Ho Kim, Daejeon (KR); Kwang Jin Lee, Daejeon (KR); Sang Il Nam, Daejeon (KR); Kyung Bok Sun, Daejeon (KR)

(73) Assignee: LG Chem, Ltd. (KR)

( * ) Notice: Subject to any disclaimer, the term of this patent is extended or adjusted under 35 U.S.C. 154(b) by 204 days.

(21) Appl. No.: 16/031,548

(22) Filed: Jul. 10, 2018

(65) Prior Publication Data
US 2019/0016838 A1  Jan. 17, 2019

(30) Foreign Application Priority Data

Jul. 14, 2017 (KR) .......................... 10-2017-0089587

(51) Int. Cl.
| | |
|---|---|
| *C08F 220/14* | (2006.01) |
| *C08F 220/18* | (2006.01) |
| *C08K 5/11* | (2006.01) |
| *C08J 9/00* | (2006.01) |
| *C08F 2/26* | (2006.01) |
| *C08K 5/42* | (2006.01) |
| *C08J 9/10* | (2006.01) |
| *C08F 222/10* | (2006.01) |

(52) U.S. Cl.
CPC .............. *C08F 220/14* (2013.01); *C08F 2/26* (2013.01); *C08F 220/18* (2013.01); *C08J 9/103* (2013.01); *C08K 5/11* (2013.01); *C08K 5/42* (2013.01); *C08F 222/102* (2020.02); *C08F 222/103* (2020.02); *C08J 9/0061* (2013.01); *C08J 2201/03* (2013.01); *C08J 2327/06* (2013.01); *C08J 2433/12* (2013.01); *C08K 2201/013* (2013.01)

(58) Field of Classification Search
USPC ............... 526/87, 323.2, 325; 525/226, 228; 521/134
See application file for complete search history.

(56) References Cited

U.S. PATENT DOCUMENTS

| | | | | |
|---|---|---|---|---|
| 8,288,494 B2 * | 10/2012 | Kwon | ..................... | C08L 33/06 525/221 |
| 2012/0142796 A1 | 6/2012 | Sato et al. | | |

FOREIGN PATENT DOCUMENTS

| | | |
|---|---|---|
| EP | 1045004 A1 | 10/2000 |
| JP | 2000178398 A | 6/2000 |
| KR | 2006-0042466 A | 5/2006 |
| WO | 0012621 A1 | 3/2000 |
| WO | 2010140317 A1 | 12/2010 |

\* cited by examiner

*Primary Examiner* — Fred M Teskin
(74) *Attorney, Agent, or Firm* — Lerner, David, Littenberg, Krumholz & Mentlik, LLP

(57) ABSTRACT

Provided is a method for preparing an acrylic copolymer, and more specifically, provided are a method for preparing an acrylic copolymer including: i) adding and polymerizing 50 to 80 parts by weight of a methyl (meth)acrylate monomer and 10 to 49 parts by weight of a C2-C12 alkyl (meth)acrylate monomer, based on 100 parts by weight of a total monomer content, in a reactor (S1); and ii) adding and polymerizing 1 to 10 parts by weight of the methyl (meth) acrylate monomer, more than 0.01 part by weight to less than 1 part by weight of an acrylic cross-linking agent, and a surfactant, based on 100 parts by weight of the total monomer content, in which a polymerization conversion ratio of the polymerization in step (S1) is 70% to 90% (S2), an acrylic copolymer prepared therefrom, and a resin composition including the same.

8 Claims, No Drawings

METHOD FOR PREPARING ACRYLIC COPOLYMER, ACRYLIC COPOLYMER AND RESIN COMPOSITION COMPRISING THE COPOLYMER

CROSS-REFERENCE TO RELATED APPLICATION(S)

This application claims benefit of priority to Korean Patent Application No. 10-2017-0089587 filed on Jul. 14, 2017 in the Korean Intellectual Property Office, the disclosure of which is incorporated herein by reference in its entirety.

BACKGROUND

1. Field

The present disclosure relates to a method for preparing an acrylic copolymer, and more particularly, to a method for preparing an acrylic copolymer having an ultra-high molecular weight, capable of being used as an acrylic processing aid, an acrylic copolymer prepared therefrom, and a resin composition including the same.

2. Description of Related Art

A vinyl chloride-based resin is inexpensive and easy to control hardness to thereby have various application fields, and is excellent in physical properties and chemical properties to thereby be widely used in various fields. In particular, recently, when producing a molded article using the vinyl chloride-based resin, there is a growing interest in foaming molding in order to reduce a weight of the vinyl chloride-based resin and to lower the cost of the molded article.

However, when foaming molding is performed using only the vinyl chloride-based resin, sufficient stretching and melt strength are not able to be obtained at the time of molding, and thus, there are disadvantages in that appearance of the molded article is poor, and foamed cells are large and uneven, resulting in reduction of a foaming ratio.

Therefore, in order to overcome these disadvantages, a method in which an acrylic processing aid including an acrylic copolymer that includes a methyl methacrylate monomer-derived repeating unit as a main component is added to a vinyl chloride-based resin while mixing with a foaming agent, or the like, has been proposed and is generally used. However, when a molecular weight of the acrylic copolymer is not sufficiently high, there is a problem in that a foaming specific gravity is high during foaming molding, and thus a structure of the foamed cell is not compact.

RELATED ART DOCUMENT (Patent Document 1) KR2006-0042466 A

SUMMARY

An aspect of the present disclosure is to provide an acrylic copolymer having an ultra-high molecular weight to improve foaming efficiency when used as a processing aid for vinyl chloride resin.

In other words, the present disclosure has been made to solve the problems of the background art, and has an object of providing a method for preparing an acrylic copolymer having an ultra-high molecular weight.

According to an aspect of the present disclosure, a method for preparing an acrylic copolymer includes: i) adding and polymerizing 50 to 80 parts by weight of a methyl (meth)acrylate monomer and 10 to 49 parts by weight of a C2-C12 alkyl (meth)acrylate monomer, based on 100 parts by weight of a total monomer content, in a reactor (S1); and ii) adding and polymerizing 1 to 10 parts by weight of the methyl (meth)acrylate monomer, more than 0.01 part by weight to less than 1 part by weight of an acrylic cross-linking agent, and a surfactant, based on 100 parts by weight of the total monomer content, in which a polymerization conversion ratio of the polymerization in step (S1) is 70% to 90% (S2).

According to another aspect of the present disclosure, an acrylic copolymer includes: 100 parts by weight of a monomer-derived repeating unit including 51 wt % to 90 wt % of a methyl (meth)acrylate monomer-derived repeating unit, 10 wt % to 49 wt % of a C2-C12 alkyl (meth)acrylate monomer-derived repeating unit; more than 0.01 part by weight to less than 1 part by weight of an acrylic cross-linking agent-derived cross-linking part; and a surfactant, wherein a weight average molecular weight is 15,000,000 g/mol or more.

Further, according to still another aspect of the present disclosure, there is provided a resin composition including the acrylic copolymer as described above and a vinyl chloride polymer.

Advantageous Effects

When the acrylic copolymer is prepared according to the present disclosure, it is possible to prepare an acrylic copolymer having an ultra-high molecular weight, and when the thus prepared acrylic copolymer is used as a processing aid for a vinyl chloride resin, processability is improved, foaming efficiency is excellent since foaming specific gravity is low, and an extrusion amount is excellent.

DETAILED DESCRIPTION

The terms and words used in the present specification and claims should not be interpreted as being limited to typical meanings or dictionary definitions, but should be interpreted as having meanings and concepts relevant to the technical scope of the present disclosure based on the rule according to which an inventor can appropriately define the concept of the term to describe most appropriately the best method he or she knows for carrying out the disclosure.

Hereinafter, the present disclosure will be described in more detail to assist in understanding the technical idea of the present disclosure.

A method for preparing an acrylic copolymer according to the present disclosure may include i) adding and polymerizing 50 to 80 parts by weight of a methyl (meth)acrylate monomer and 10 to 49 parts by weight of a C2-C12 alkyl (meth)acrylate monomer, based on 100 parts by weight of a total monomer content, in a reactor (S1); and ii) adding and polymerizing 1 to 10 parts by weight of the methyl (meth) acrylate monomer, more than 0.01 part by weight to less than 1 part by weight of an acrylic cross-linking agent, and a surfactant, based on 100 parts by weight of the total monomer content, in which a polymerization conversion ratio of the polymerization in step (S1) is 70% to 90% (S2).

In other words, the method for preparing an acrylic copolymer according to the present disclosure includes a step of polymerizing an acrylic copolymer gradationally in two steps of (S1) and (S2), specifically, may be a method for preparing an acrylic copolymer having an ultra-high molecular weight by polymerizing an acrylic copolymer as a main component of the acrylic copolymer through step (S1), and then cross-linking the acrylic copolymer polymerized in step (S1) through step (S2). When the thus-prepared acrylic copolymer having an ultra-high molecular weight is used as a processing aid at the time of foaming a vinyl chloride resin, there is an effect of improving foaming properties and processability.

The term 'ultra-high molecular weight' used herein may mean a very high molecular weight based on a weight average molecular weight. For example, the ultra-high molecular weight may mean a weight average molecular weight of 15,000,000 g/mol or more, a weight average molecular weight of 16,000,000 g/mol to 20,000,000 g/mol or, a weight average molecular weight of 16,000,000 g/mol to 17,000,000 g/mol.

According to an embodiment of the present disclosure, step (S1), which is a step of polymerizing an acrylic copolymer as a main component of the acrylic copolymer, may be a step of polymerizing a methyl (meth)acrylate monomer and a C2-C12 alkyl (meth)acrylate monomer. The 'main component' may be a plurality of components, that is, two or more acrylic copolymer components, to be cross-linked by a cross-linking agent to be added in the step (S2) in the acrylic copolymer in which the polymerization is completed.

According to an embodiment of the present disclosure, the methyl (meth)acrylate monomer may be added in a content of 50 to 80 parts by weight, 60 to 80 parts by weight, or 70 to 80 parts by weight, based on 100 parts by weight of the total monomer content. Within this range, processability and foaming property are excellent without deteriorating mechanical properties of a molded article which is molded from the resin composition including the acrylic copolymer as the processing aid. In addition, the methyl (meth)acrylate monomer may mean methyl acrylate or methyl methacrylate.

Further, according to an embodiment of the present disclosure, the C2-C12 alkyl (meth)acrylate monomer may be added, for example, in a content of 10 to 49 parts by weight, 12 to 37 parts by weight, or 14 to 26 parts by weight, based on 100 parts by weight of the total monomer content. Within this range, an acrylic copolymer having an ultra-high molecular weight is capable of being prepared, and at the time of foaming molding of the resin composition including the acrylic copolymer as the processing aid, a foaming specific gravity is low.

As another example, the C2-C12 alkyl group in the C2-C12 alkyl (meth)acrylate may include both a linear C2-C12 alkyl group and a branched C3-C12 alkyl group. As a specific example, the C2-C12 alkyl (meth)acrylate monomer may be ethyl (meth)acrylate, propyl (meth)acrylate, butyl (meth)acrylate, pentyl (meth)acrylate, hexyl (meth)acrylate, heptyl (meth)acrylate, octyl (meth)acrylate, 2-ethylhexyl (meth)acrylate, nonyl (meth)acrylate, decyl (meth)acrylate, undecyl (meth)acrylate, or dodecyl (meth)acrylate. As another example, the alkyl (meth)acrylate monomer may be an alkyl (meth)acrylate monomer containing a C2-C12 alkyl group, or a C2-C8 alkyl group, or a C2-C5 alkyl group. In addition, the C2-C12 alkyl (meth)acrylate monomer may mean a C2-C12 alkyl acrylate or a C2-C12 alkyl methacrylate.

Meanwhile, in steps (S1) and (S2), the 'total monomer content' may refer to the total content of the monomers to be added during the preparation of the acrylic copolymer according to the present disclosure. For example, the total monomer content may be a total content of the methyl (meth)acrylate monomer and the C2-C12 alkyl (meth)acrylate monomer which are added in steps (S1) and (S2).

According to an embodiment of the present disclosure, the weight average molecular weight of the acrylic copolymer polymerized in step (S1) may be 6,000,000 g/mol to 7,000,000 g/mol, 6,500,000 g/mol to 7,000,000 g/mol, or 6,500,000 g/mol to 6,900,000 g/mol. Within this range, according to step (S2), it is possible to polymerize the acrylic copolymer having an ultra-high molecular weight.

According to an embodiment of the present disclosure, step (S2), which is a step for preparing an acrylic copolymer having an ultra-high molecular weight by cross-linking the acrylic copolymer component polymerized in step (S1), may be a step of adding the methyl (meth)acrylate monomer, the acrylic cross-linking agent, and a surfactant, followed by polymerization and cross-linking.

According to an embodiment of the present disclosure, step (S2) may be performed when a polymerization conversion ratio of the polymerization in step (S1) is 70% to 90%, 75% to 90%, or 80% to 90%. Within this range, the polymerization in step (S1) above is sufficiently performed, and thus the cross-linking by the acrylic cross-linking agent enables preparation of the acrylic copolymer satisfying the desired weight average molecular weight in the present disclosure, and prevention of the foaming properties from being deteriorated.

According to an embodiment of the present disclosure, the methyl (meth)acrylate monomer may be the same monomer as the methyl (meth)acrylate monomer added in step (S1), and may be added in a content of 1 parts by weight to 10 parts by weight, 3 parts by weight to 8 parts by weight, or 4 parts by weight to 6 parts by weight, based on 100 parts by weight of the total monomer content. At the time of polymerization of step (S2) within this range, cross-linking property is improved, and processability and foaming property are excellent without deteriorating mechanical properties of the molded article which is molded from the resin composition including the acrylic copolymer as the processing aid.

Meanwhile, according to an embodiment of the present disclosure, a total content of the content of methyl (meth)acrylate monomer and the content of the C2-C12 alkyl (meth)acrylate monomer added in step (S1) and the content of methyl (meth)acrylate monomer added in step (S2) may be 100 parts by weight. In other words, the total content of the content of the methyl (meth)acrylate monomer (S1), the content of the C2-C12 alkyl (meth)acrylate monomer (S1), and the content of the methyl (meth)acrylate monomer (S2) may be 100 parts by weight based on 100 parts by weight of the total monomer content.

According to an embodiment of the present disclosure, the acrylic cross-linking agent, which is a cross-linking agent for cross-linking the acrylic copolymer component prepared in step (S1), may be selected from the group consisting of pentaerythritol diacrylate, pentaerythritol triacrylate, and pentaerythritol tetraacrylate. In this case, it is possible to prepare an acrylic copolymer having an ultra-high molecular weight for the purpose of the present disclosure by simultaneously cross-linking the plurality of acrylic copolymer components prepared in the step (S1), and thus the molded article which is molded from the resin composition including the acrylic copolymer as the processing aid has an excellent foaming property.

According to an embodiment of the present disclosure, the acrylic cross-linking agent added in step (S2) may be added in a content of more than 0.01 part by weight to less than 1 part by weight, 0.03 part by weight to 0.8 parts by weight, or 0.05 part by weight to 0.5 part by weight, based on 100 parts by weight of the total monomer content. Within this range, it is possible to prepare the acrylic copolymer having an ultra-high molecular weight, and to prevent gelation of the polymerized acrylic copolymer.

In addition, according to an embodiment of the present disclosure, the surfactant acts as an internal surfactant for improving an activity of an inner surface of an acrylic copolymer having an ultra-high weight average molecular weight, and may be an anionic sulfate-based surfactant containing a polyoxyalkylene ether sulfate group in a compound, and has an effect of preventing aggregation of the acrylic copolymer by containing the polyoxyalkylene group in the compound. Further, according to an embodiment of the present disclosure, the sulfate-based surfactant may be an allyloxy sulfate-based surfactant containing an allyloxy group in the compound, and may participate in a polymerization reaction by containing a reactive allyloxy group in the compound, thereby forming a repeating unit form in the copolymer, and thus, it is possible to improve an activity of the inner surface in the acrylic copolymer.

According to an embodiment of the present disclosure, the surfactant may be represented by Chemical Formula 1 below, and in this case, it is possible to prevent aggregation and lowering of fluidity due to ultra-high molecular weight, thereby improving an extrusion amount when molding the resin composition including the acrylic copolymer as the processing aid.

[Chemical Formula 1]

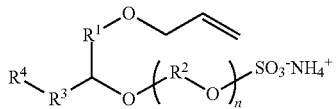

In Chemical Formula 1, $R^1$, $R^2$, and $R^3$ may be each independently a C1-C10 alkylene group, $R^4$ may be a C1-C30 alkyl group, a C5-C30 cycloalkyl group, a C6-C30 aryl group, a C7-C30 alkylaryl group, a C7-C30 arylalkyl group, a C1-C30 alkyloxy group, a C5-C30 cycloalkyloxy group, a C6-C30 aryloxy group, a C7-C30 alkylaryloxy group, or a C7-C30 arylalkyloxy group, and n may be an integer selected from 1 to 30.

As a specific example, in Chemical Formula 1, $R^1$, $R^2$, and $R^3$ may be each independently a C1-C5 alkylene group, $R^4$ may be a C1-C30 alkyloxy group, a C5-C30 cycloalkyloxy group, a C6-C30 aryloxy group, a C7-C30 alkylaryloxy group, or a C7-C30 arylalkyloxy group, and n may be an integer selected from 5 to 20.

As a more specific example, in Chemical Formula 1, $R^1$, $R^2$, and $R^3$ may be each independently a C1-C3 alkylene group, $R^4$ may be a C6-C30 aryloxy group, a C7-C30 alkylaryloxy group or a C7-C30 arylalkyloxy group, and n may be an integer selected from 5 to 15.

According to an embodiment of the present disclosure, the surfactant represented by Chemical Formula 1 may be represented by Chemical Formula 2 below:

[Chemical Formula 2]

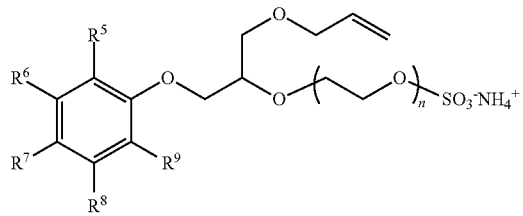

in Chemical Formula 2, $R^5$ to $R^9$ may be each independently hydrogen or a C1-C30 alkyl group, $R^5$ to $R^9$ may not be simultaneously hydrogen, and n may be an integer selected from 1 to 30.

As a specific example, in Chemical Formula 2, $R^5$ to $R^9$ may be each independently hydrogen or a C1-C20 alkyl group, $R^5$ to $R^9$ may not be simultaneously hydrogen, and n may be an integer selected from 5 to 20.

As a more specific example, in Chemical Formula 2, $R^5$ to $R^9$ may be each independently hydrogen or a C5-C15 alkyl group, $R^5$ to $R^9$ may not be simultaneously hydrogen, and n may be an integer selected from 5 to 15.

According to an embodiment of the present disclosure, the surfactant represented by Chemical Formula 2 may be ammonium sulfate allyloxy nonylphenoxy poly(ethyleneoxy) (10) ether (DNS-86). In this case, it is possible to prevent aggregation and lowering of fluidity due to the ultra-high molecular weight, thereby improving the extrusion amount when molding the resin composition including the acrylic copolymer as the processing aid.

According to an embodiment of the present disclosure, the surfactant added in the step (S2) may be added in a content of 0.1 part by weight to 1 part by weight, 0.3 part by weight to 0.8 part by weight, or 0.4 part by weight to 0.6 part by weight, based on 100 parts by weight of the total monomer content. Within this range, it is possible to prevent aggregation and lowering of fluidity due to the ultra-high molecular weight, thereby improving the extrusion amount when molding the resin composition including the acrylic copolymer as the processing aid.

According to an embodiment of the present disclosure, the weight average molecular weight of the acrylic copolymer polymerized in step (S2) may be 15,000,000 g/mol or more, 16,000,000 g/mol to 20,000,000 g/mol, or 16,000,000 g/mol to 17,000,000 g/mol. When the acrylic copolymer prepared within this range is used as the processing aid for the vinyl chloride resin, processability may be improved, foaming efficiency may be excellent since foaming specific gravity is low, and the extrusion amount may be excellent.

Further, according to an embodiment of the present disclosure, an average particle diameter of the acrylic copolymer polymerized in step (S2) may be 100 nm to 1,000 nm, 100 nm to 500 nm, or 120 nm to 200 nm. When the acrylic copolymer prepared within this range is used as the processing aid for the vinyl chloride resin, processability and foaming property may be excellent. Here, the average particle diameter (D50) may be obtained by measuring the average particle diameter of the acrylic copolymer dispersed in the latex through dynamic laser light scattering by using the prepared rubber latex.

Meanwhile, according to an embodiment of the present disclosure, the polymerization of step (S1) and step (S2) may be performed in the presence of a methyl (meth) acrylate monomer and an alkyl (meth)acrylate monomer, by radical polymerization using a peroxide-based, redox, or azo-based initiator. As the polymerization method, emulsion polymerization, bulk polymerization, solution polymerization or suspension polymerization may be used. From the viewpoint of preparing the acrylic copolymer having an ultra-high molecular weight according to the present disclosure, the polymerization may be performed by the emulsion polymerization, and thus the polymerization may be performed by including an emulsifier. In addition, the acrylic copolymer prepared in step (S2) may be obtained in the form of an acrylic copolymer latex in which an acrylic copolymer is dispersed in a solvent. In order to obtain an acrylic copolymer in the form of a powder from the acrylic copolymer latex, aggregation, aging, dehydration and drying processes, or the like, may be performed.

The acrylic copolymer according to the present disclosure may include 100 parts by weight of a monomer-derived repeating unit including 51 wt % to 90 wt % of a methyl (meth)acrylate monomer-derived repeating unit, 10 wt % to 49 wt % of a C2-C12 alkyl (meth)acrylate monomer-derived repeating unit; more than 0.01 part by weight to less than 1 part by weight of an acrylic cross-linking agent-derived cross-linking part; and a surfactant, wherein a weight average molecular weight may be 15,000,000 g/mol or more.

According to an embodiment of the present disclosure, the acrylic copolymer may be prepared according to the method for preparing an acrylic copolymer according to the present disclosure, and may be obtained by cross-linking a plurality of acrylic copolymers including the methyl (meth)acrylate monomer-derived repeating unit and the C2-C12 alkyl (meth)acrylate monomer-derived repeating unit by the acrylic cross-linking agent-derived cross-linking part.

The term "monomer-derived repeating unit" in the present disclosure may refer to a component derived from a monomer, a structure thereof, or a substance itself, and may mean a repeating unit in which when polymerizing a polymer, a monomer to be added participates in a polymerization reaction, and forms in the polymer.

The term "cross-linking agent-derived cross-linking part" used herein may refer to a component derived from the cross-linking agent, a structure thereof, or a substance itself, and may mean cross-linking part in which when cross-linking between the polymers, a cross-linking agent to be added participates in a cross-linking reaction between the polymers, and is subjected to cross-linking the polymer and the polymer.

According to an embodiment of the present disclosure, the methyl (meth)acrylate monomer-derived repeating unit may be a repeating unit in which the methyl (meth)acrylate monomer added in steps (S1) and (S2) of the method for preparing the acrylic copolymer according to the present disclosure is polymerized, the C2-C12 alkyl (meth)acrylate monomer-derived repeating unit may be a repeating unit in which the C2-C12 alkyl (meth)acrylate monomer added in step (S1) of the method for preparing the acrylic copolymer according to the present disclosure is polymerized, and the acrylic cross-linking agent-derived cross-linking part may be a cross-linking part in the form in which the acrylic cross-linking agent added in step (S2) of the method for preparing the acrylic copolymer according to the present disclosure is subjected to cross-linking the plurality of acrylic copolymers polymerized in step (S1).

According to an embodiment of the present disclosure, the methyl (meth)acrylate monomer-derived repeating unit may be added in a content of 51 to 90 wt %, 63 to 88 wt %, or 74 wt % to 86 wt %, based on 100 parts by weight of the monomer-derived repeating unit. Within this range, processability and foaming property are excellent without deteriorating mechanical properties of a molded article which is molded from the resin composition including the acrylic copolymer as the processing aid.

Further, according to an embodiment of the present disclosure, the C2-C12 alkyl (meth)acrylate monomer-derived repeating unit may be added in a content of 10 to 49 wt %, 12 to 37 wt %, or 14 wt % to 26 wt %, based on 100 parts by weight of the monomer-derived repeating unit. Within this range, at the time of foaming molding of the resin composition including the acrylic copolymer as the processing aid, a foaming specific gravity is low.

Further, according to an embodiment of the present disclosure, the acrylic cross-linking agent-derived cross-linking part may be added in a content of more than 0.01 part by weight to less than 1 part by weight, 0.03 part by weight to 0.8 part by weight, or 0.05 part by weight to 0.5 part by weight, based on 100 parts by weight of the monomer-derived repeating unit. Within this range, it is possible to prevent gelation of the acrylic copolymer.

Meanwhile, according to an embodiment of the present disclosure, the surfactant is used to prevent aggregation and lowering of fluidity due to ultra-high molecular weight of the acrylic copolymer when foaming molding the resin composition including the acrylic copolymer as the processing aid, thereby improving the extrusion amount. In the acrylic copolymer, the surfactant may be present in the form of a surfactant-derived repeating unit that participates in the polymerization reaction and forms the repeating unit in the polymer, and further may be present in the form in which the surfactant is dispersed on the three-dimensional network in particles of the acrylic copolymer without participating in the polymerization reaction. The surfactant may be, for example, added in a content of 0.1 part by weight to 1 part by weight, 0.3 part by weight to 0.8 part by weight, or 0.4 part by weight to 0.6 part by weight, based on 100 parts by weight of the monomer-derived repeating unit. Within this range, it is possible to prevent aggregation and lowering of fluidity due to the ultra-high molecular weight, thereby improving the extrusion amount when molding the resin composition including the acrylic copolymer as the processing aid.

According to an embodiment of the present disclosure, the weight average molecular weight of the acrylic copolymer may be 15,000,000 g/mol or more, 16,000,000 g/mol to 20,000,000 g/mol, or 16,000,000 g/mol to 17,000,000 g/mol. Within this range, when the acrylic copolymer is used as the processing aid for the vinyl chloride resin, processability may be improved, foaming efficiency may be excellent since foaming specific gravity is low, and the extrusion amount may be excellent.

As described above, the acrylic copolymer according to the present disclosure may be an acrylic processing aid included in the vinyl chloride resin composition used for foaming.

Meanwhile, the resin composition according to the present disclosure may include the acrylic copolymer and a vinyl chloride polymer. In other words, the resin composition may be a vinyl chloride-based resin composition, and the vinyl chloride-based resin composition may be a vinyl chloride-based resin composition for foaming.

According to an embodiment of the present disclosure, the vinyl chloride polymer may not be particularly limited as long as it is a vinyl chloride polymer that is able to be used for foaming. Meanwhile, the resin composition may include 1 to 20 parts by weight, 1 to 10 parts by weight, or 3 to 8 parts by weight of the acrylic copolymer, based on 100 parts by weight of the vinyl chloride polymer. Within this range, the processability, the extrusion amount, and the foaming property of the resin composition are excellent.

The resin composition according to the present disclosure may further include, in addition to the vinyl chloride polymer and the acrylic copolymer, a foaming agent, a stabilizer, a processing aid, a heat stabilizer, a lubricant, a pigment, a dye, and an antioxidant, or the like, within a range in which physical properties are not deteriorated, if necessary.

According to an embodiment of the present disclosure, a foam molded article having a foaming length of 30 mm, which is obtained by foaming the resin composition using a twin-screw extruder at a cylinder temperature of 180° C., a screw speed of 30 rpm, and a slit die size of 2 mm (thickness)×30 mm (width), may have a foaming specific gravity of less than 0.51 g/cm$^3$, 0.4 g/cm$^3$ to 0.5 g/cm$^3$, or 0.42 g/cm$^3$ to 0.45 g/cm$^3$. Within this range, foaming magnification is high, and thus the foaming property is excellent.

Hereinafter, the present disclosure will be described in detail with reference to the following Examples. The following Examples describe the present disclosure by way of example only. It is apparent to those skilled in the art that various changes and modifications can be made in the scope and spirit of the present disclosure and that the present disclosure is not limited thereto.

EXAMPLE

Example 1

Polymerization of Acrylic Copolymer: Step 1

A four-necked flask reactor equipped with a stirrer, a thermometer, a nitrogen inlet, and a circulating condenser was prepared, 100 parts by weight of deionized water, 0.002 part by weight of ferrous sulfate, and 0.04 part by weight of disodium ethylenediaminetetraacetate were added thereto, and an internal temperature of the reactor was maintained at 40° C. under a nitrogen atmosphere.

Meanwhile, 70 parts by weight of deionized water, 0.6 part by weight of sodium lauryl sulfate as an emulsifier, 70 parts by weight of methyl methacrylate (MMA), and 25 parts by weight of butyl acrylate (BA) were added to prepare a monomer pre-emulsion. When an internal temperature of the reactor reached 40° C., 0.001 part by weight of tert-butyl hydroperoxide and 0.05 part by weight of sodium formaldehyde sulfoxylate as initiators were added to the reactor at one time together with the prepared monomer pre-emulsion, and the reaction was allowed to proceed.

Polymerization of Acrylic Copolymer: Step 2

After the initiation of the reaction, at the time when a polymerization conversion ratio was 90%, 0.05 part by weight of pentaerythritol tetraacrylate (PETTA) as an acrylic cross-linking agent, 0.5 part by weight of ammonium sulfate allyloxy nonylphenoxy poly(ethyleneoxy)(10) ether (DNS-86) as the surfactant, and 5 parts by weight of methyl methacrylate (MMA) were added at one time, and 0.001 part by weight of tert-butyl hydroperoxide and 0.03 part by weight of sodium formaldehyde sulfoxylate as initiators were added at one time, and the reaction was allowed to proceed for 3 hours. The total solid contents (TSC) of the acrylic copolymer latex prepared through the reaction was 35 wt %, and the average particle diameter of the acrylic copolymer in the latex was 160 nm.

Preparation of Acrylic Copolymer Powder

Then, in order to obtain the acrylic copolymer in the form of a powder, the obtained acrylic copolymer latex was diluted with deionized water to a total solid content of 15 wt % based on the solid content, and a temperature of the acrylic copolymer latex was raised to 75° C. Subsequently, 6 parts by weight of an aqueous solution of magnesium sulfate (concentration of 10 wt %) was added at one time to induce agglomeration, thereby obtaining a slurry. The obtained slurry was then washed with ion exchange water two to three times, and the washing water was removed through filtration, followed by drying at 80° C. for 3 hours using a small fluidized bed dryer to obtain an acrylic copolymer powder sample.

Example 2

Example 2 was performed in the same manner as in Example 1, except that 0.5 part by weight of pentaerythritol tetraacrylate was added as an acrylic cross-linking agent in Step 2 of the polymerization of the acrylic copolymer.

Example 3

Example 3 was performed in the same manner as in Example 1, except that 80 parts by weight of methyl methacrylate and 15 parts by weight of butyl acrylate were added at the time of preparing the monomer pre-emulsion in Step 1 of the polymerization of the acrylic copolymer.

Example 4

Example 4 was performed in the same manner as in Example 3, except that 0.25 part by weight of pentaerythritol tetraacrylate was added as an acrylic cross-linking agent in Step 2 of the polymerization of the acrylic copolymer.

Example 5

Example 5 was performed in the same manner as in Example 3, except that 0.5 part by weight of pentaerythritol tetraacrylate was added as an acrylic cross-linking agent in Step 2 of the polymerization of the acrylic copolymer.

Comparative Example 1

Comparative Example 1 was performed in the same manner as in Example 1, except that 45 parts by weight of methyl methacrylate and 50 parts by weight of butyl acrylate were added at the time of preparing the monomer pre-emulsion in Step 1 of the polymerization of the acrylic copolymer.

Comparative Example 2

Comparative Example 2 was performed in the same manner as in Example 1, except that the pentaerythritol tetraacrylate as the acrylic cross-linking agent was not added in Step 2 of the polymerization of the acrylic copolymer.

Comparative Example 3

Comparative Example 3 was performed in the same manner as in Example 1, except that 0.01 part by weight of pentaerythritol tetraacrylate was added as an acrylic cross-linking agent in Step 2 of the polymerization of the acrylic copolymer.

Comparative Example 4

Comparative Example 4 was performed in the same manner as in Example 3, except that the DNS-86 as a surfactant was not added in Step 2 of the polymerization of the acrylic copolymer.

Comparative Example 5

Comparative Example 5 was performed in the same manner as in Example 3, except that the pentaerythritol tetraacrylate as the acrylic cross-linking agent and the DNS-86 as the surfactant were not added in Step 2 of the polymerization of the acrylic copolymer.

Comparative Example 6

Comparative Example 6 was performed in the same manner as in Example 3, except that 1 part by weight of pentaerythritol tetraacrylate was added as the acrylic cross-linking agent in Step 2 of the polymerization of the acrylic copolymer.

Comparative Example 7

Comparative Example 7 was performed in the same manner as in Example 2, except that 90 parts by weight of methyl methacrylate and 5 parts by weight of butyl acrylate were added at the time of preparing the monomer pre-emulsion in Step 1 of the polymerization of the acrylic copolymer.

Experimental Example

Experimental Example 1

At the time of polymerizing the acrylic copolymers in Examples 1 to 5 and Comparative Examples 1 to 7, each weight average molecular weight of the acrylic copolymers prepared in Steps 1 and 2 was measured by the following method, and shown in Table 1 together with the content (part by weight) of the monomer, the acrylic cross-linking agent, and the surfactant to be added in each step.

weight average molecular weight (Mw, ×10$^4$ g/mol): the sample in the form of powder was dissolved in a tetrahydrofuran (THF) solvent at a concentration of 0.25 wt %, and the weight average molecular weight was measured using gel permeation chromatography.

As shown in Table 1, it could be confirmed that the acrylic copolymers of Examples 1 to 5 prepared according to the present disclosure had a weight average molecular weight of 1,500×10$^4$ g/mol or more after Step 2 of the polymerization.

On the other hand, in Comparative Example 1 in which methyl methacrylate was not added sufficiently but butyl acrylate was added in an excessive content, it could be confirmed that the weight average molecular weight was not sufficiently increased even through the same contents of the acrylic cross-linking agent and the surfactant were added, and in Comparative Examples 2 and 5 in which no acrylic cross-linking agent was added and Comparative Example 3 in which a small amount of the acrylic cross-linking agent was added, it could be confirmed that the weight average molecular weight was not increased. Further, in Comparative Example 7 in which methyl methacrylate was added in an excessive content, it could be confirmed that the weight average molecular weight thereof was not sufficiently increased.

Experimental Example 2

In order to evaluate the foaming processing property when the acrylic copolymer was used as a processing aid for a vinyl chloride resin, 5 parts by weight of a composite stabilizer (product name: KD-105, manufactured by Dansuk Industrial Co., Ltd.), 7 parts by weight of calcium carbonate (CaCO$_3$) as a filler, 2 parts by weight of titanium dioxide (TiO$_2$) and 0.2 part by weight of a wax-type lubricant (product name: AC316A) were added to 100 parts by weight of the vinyl chloride resin (product name: LS080, manufactured by LG Chem Co., Ltd.), and then 5 parts by weight of each of the acrylic copolymers prepared in Examples 1 to 5 and Comparative Examples 1 to 7 and 0.8 part by weight of azodicarbonamide as a foaming agent were added thereto. The mixture was kneaded using a Henschel mixer while heating up to 110° C. to prepare a vinyl chloride-based resin composition including the acrylic copolymer. Physical properties related to the foaming property were measured by the following methods and shown in Table 2.

Foaming specific gravity (g/cm$^3$), cell uniformity and surface properties: a foaming density of a foam molded article cut into a size of 30 mm after foaming the above-prepared vinyl chloride-based resin composition for 1 minute using a Haake twin extruder at a cylinder temperature of 180° C., a screw speed of 30 rpm, and a slit die size of 2 mm (thickness)×30 mm (width) was used to measure a foaming specific gravity using a plastic specific gravity meter. Here, the higher the foaming specific gravity, the lower the foaming magnification, which indicates that the foaming property was deteriorated.

Further, cell uniformity was evaluated from 1 point to 5 points by observing a cross-section of the foam molded article obtained above with an optical microscope, and determining a case where foamed cells were uniform as 5 points, a case where a portion of the foamed cells was not uniform as 3 points, and a case where most of the foamed cells were not uniform as 1 point.

TABLE 1

| Classification | | Example | | | | | Comparative Example | | | | | | |
|---|---|---|---|---|---|---|---|---|---|---|---|---|---|
| | | 1 | 2 | 3 | 4 | 5 | 1 | 2 | 3 | 4 | 5 | 6 | 7 |
| Step 1 | MMA | 70 | 70 | 80 | 80 | 80 | 45 | 70 | 70 | 80 | 80 | 80 | 90 |
| | BA | 25 | 25 | 15 | 15 | 15 | 50 | 25 | 25 | 15 | 15 | 15 | 5 |
| | Mw | 650 | 650 | 690 | 690 | 690 | 550 | 660 | 660 | 690 | 690 | 690 | 690 |
| Step 2 | PETTA | 0.05 | 0.5 | 0.05 | 0.25 | 0.5 | 0.05 | — | 0.01 | 0.05 | — | 1.0 | 0.5 |
| | DNS-86 | 0.5 | 0.5 | 0.5 | 0.5 | 0.5 | 0.5 | 0.5 | 0.5 | — | — | 0.5 | 0.5 |
| | MMA | 5 | 5 | 5 | 5 | 5 | 5 | 5 | 5 | 5 | 5 | 5 | 5 |
| | Mw | 1600 | 1600 | 1700 | 1700 | 1650 | 1200 | 900 | 1000 | 1700 | 1000 | 1700 | 1400 |

Further, surface property was evaluated from 1 point to 5 points by visually observing a surface state of the foam molded article obtained above, and determining a case where there was no die mark and no flow mark and the thickness was uniform as 5 points, a case where the die mark and the flow mark were partially present and the thickness was not uniform as 3 points, and a case where the die mark and the flow mark were mostly present and the thickness was not uniform at all as 1 point.

Extrusion amount (g/min): an extrusion amount was measured by extruding the above-prepared vinyl chloride-based resin composition using the Haake twin extruder at a temperature of 180° C. for the cylinder 1, 185° C. for the cylinder 2, 185° C. for the cylinder 3, and 190° C. for a die, and at a screw speed of 40 rpm.

chloride resin, 100 parts by weight of a vinyl chloride resin (product name: LS080, manufactured by LG Chem Co., Ltd., degree of polymerization: 800), 3 parts by weight of a tin-based stabilizer, 0.9 part by weight of calcium stearate were added to a Henschel mixer at room temperature, and kneaded at a stirring rate of 1,000 rpm while heating up to 115° C., and then cooled up to 40° C., thereby preparing a master batch. To the master batch, 3 parts by weight of each of the acrylic copolymers prepared in Examples 1 to 5 and Comparative Examples 1 to 7 was added, and further kneaded at room temperature. Then, the adhesion property on a roll surface was evaluated from 1 point to 5 points by milling 100 parts by weight of the powder mixture for 4 minutes using a 6-inch 2-roll mill under conditions of a roll kneading temperature of 200° C., a roll rotation number of

TABLE 2

| | Example | | | | | Comparative Example | | | | | | |
|---|---|---|---|---|---|---|---|---|---|---|---|---|
| Classification | 1 | 2 | 3 | 4 | 5 | 1 | 2 | 3 | 4 | 5 | 6 | 7 |
| Foaming specific gravity | 0.44 | 0.45 | 0.42 | 0.43 | 0.44 | 0.52 | 0.57 | 0.53 | 0.45 | 0.57 | 0.53 | 0.51 |
| Cell uniformity | 5 | 5 | 5 | 5 | 5 | 3 | 1 | 3 | 5 | 1 | 3 | 4 |
| Surface property | 5 | 5 | 4 | 4 | 4 | 5 | 5 | 5 | 4 | 4 | 3 | 2 |
| Extrusion amount | 88 | 87 | 88 | 89 | 88 | 84 | 87 | 84 | 70 | 71 | 89 | 83 |

As shown in Table 2, when the acrylic copolymer prepared according to the present disclosure was used as the processing aid, it could be confirmed that the foam specific gravity was low, the extrusion amount was high, and the cell uniformity and surface property of the foam molded article were excellent.

On the other hand, in Comparative Example 1 in which the methyl methacrylate was not added sufficiently but the butyl acrylate was added in an excessive content, it could be confirmed that the weight average molecular weight was not sufficiently increased, and thus the foaming specific gravity was high and the cell uniformity was deteriorated, in Comparative Examples 2 and 5 in which the acrylic cross-linking agent was not added, and Comparative Example 3 in which the small amount of the acrylic cross-linking agent was added, it could be confirmed that the weight average molecular weight was not increased, and thus the foaming specific gravity was high and the cell uniformity was deteriorated. In particular, in Comparative Example 5 in which both the acrylic cross-linking agent and the surfactant were not added, it could be confirmed that the extrusion amount was extremely lowered.

In addition, in Comparative Example 4 in which no surfactant was added, it could be confirmed that the weight average molecular weight of the acrylic copolymer was high, but the extrusion amount was remarkably lowered, and in Comparative Example 6 in which the acrylic cross-linking agent was added in an excessive content, it could be confirmed that the gel was formed, and thus the foaming specific gravity, the cell uniformity, and the surface property were all deteriorated, and in Comparative Example 7 in which the methyl methacrylate was added in an excessive content, it could be confirmed that the weight average molecular weight was not sufficiently increased, and thus the foaming specific gravity and the surface property were deteriorated.

Experimental Example 3

In order to evaluate adhesion property when the acrylic copolymer was used as the processing aid for the vinyl 14×15 rpm, and a roll interval of 0.3 mm, and determining a case where there was no elongation at all while peeling as 5 points, a case where the elongation was hardly observed while peeling as 4 points, a case where the elongation was partially observed while peeling as 3 points, a case where the elongation was mostly observed while peeling as 2 points, and a case where the peeling was not performed as 1 point.

TABLE 3

| | Example | | | | | Comparative Example | | | | | | |
|---|---|---|---|---|---|---|---|---|---|---|---|---|
| Classification | 1 | 2 | 3 | 4 | 5 | 1 | 2 | 3 | 4 | 5 | 6 | 7 |
| Adhesion property | 5 | 5 | 5 | 5 | 5 | 5 | 1 | 3 | 5 | 1 | 2 | 5 |

As shown in Table 3, when the acrylic copolymer prepared according to the present disclosure was used as the processing aid, it could be confirmed that the adhesion property was excellent.

On the other hand, in Comparative Examples 2 and 5 in which no acrylic cross-linking agent was added and in Comparative Example 3 in which the small content of the acrylic cross-linking agent was added, it could be confirmed that the weight average molecular weight was not increased, and thus the adhesion property was very deteriorated. Further, in Comparative Example 6 in which the acrylic cross-linking agent was added in an excessive content, it could be confirmed that a gel was formed, and thus the adhesion property was deteriorated.

It was confirmed from the above-described results that the present inventors found that when the acrylic copolymer having an ultra-high molecular weight was prepared according to the present disclosure and the prepared acrylic copolymer having an ultra-high molecular weight was used as the processing aid for the vinyl chloride resin, the foaming efficiency was excellent since foaming specific gravity was low, the processability was excellent, the cells of the molded article were uniform, and the surface property was excellent.

What is claimed is:

1. A method for preparing an acrylic copolymer comprising:
   i) adding and polymerizing 50 to 80 parts by weight of a methyl (meth)acrylate monomer and 10 to 49 parts by weight of a C2-C12 alkyl (meth)acrylate monomer, based on 100 parts by weight of a total monomer content, in a reactor (S1); and
   ii) adding and polymerizing 1 to 10 parts by weight of the methyl (meth)acrylate monomer, more than 0.01 part by weight to less than 1 part by weight of an acrylic cross-linking agent, and a surfactant, based on 100 parts by weight of the total monomer content, in which a polymerization conversion ratio of the polymerization in (S1) is 70% to 90%.

2. The method of claim 1, wherein the acrylic cross-linking agent is at least one selected from the group consisting of pentaerythritol diacrylate, pentaerythritol triacrylate, and pentaerythritol tetraacrylate.

3. The method of claim 1, wherein the surfactant is represented by Chemical Formula 1 below:

[Chemical Formula 1]

in Chemical Formula 1,
$R^1$, $R^2$, and $R^3$ are each independently a C1-C10 alkylene group,
$R^4$ is a C1-C30 alkyl group, a C5-C30 cycloalkyl group, a C6-C30 aryl group, a C7-C30 alkylaryl group, a C7-C30 arylalkyl group, a C1-C30 alkyloxy group, a C5-C30 cycloalkyloxy group, a C6-C30 aryloxy group, a C7-C30 alkylaryloxy group, or a C7-C30 arylalkyloxy group, and
n is an integer selected from 1 to 30.

4. The method of claim 1, wherein the acrylic copolymer polymerized in (S1) has a weight average molecular weight of 6,000,000 g/mol to 7,000,000 g/mol.

5. The method of claim 1, wherein the acrylic copolymer polymerized in (S2) has a weight average molecular weight of 15,000,000 g/mol or more.

6. An acrylic copolymer comprising:
   100 parts by weight of a monomer-derived repeating unit including 51 wt % to 90 wt % of a methyl (meth)acrylate monomer-derived repeating unit, 10 wt % to 49 wt % of a C2-C12 alkyl (meth)acrylate monomer-derived repeating unit;
   more than 0.01 part by weight to less than 1 part by weight of an acrylic cross-linking agent-derived cross-linking part; and
   a surfactant,
   wherein a weight average molecular weight is 15,000,000 g/mol or more.

7. A resin composition comprising the acrylic copolymer of claim 6 and a vinyl chloride polymer.

8. The resin composition of claim 7, wherein a foam molded article having a foaming length of 30 mm, which is obtained by foaming the resin composition using a twin-screw extruder at a cylinder temperature of 180° C., a screw speed of 30 rpm, and a slit die size of 2 mm (thickness)×30 mm (width), has a foaming specific gravity of less than 0.51 g/cm³.

* * * * *